Figure 1:
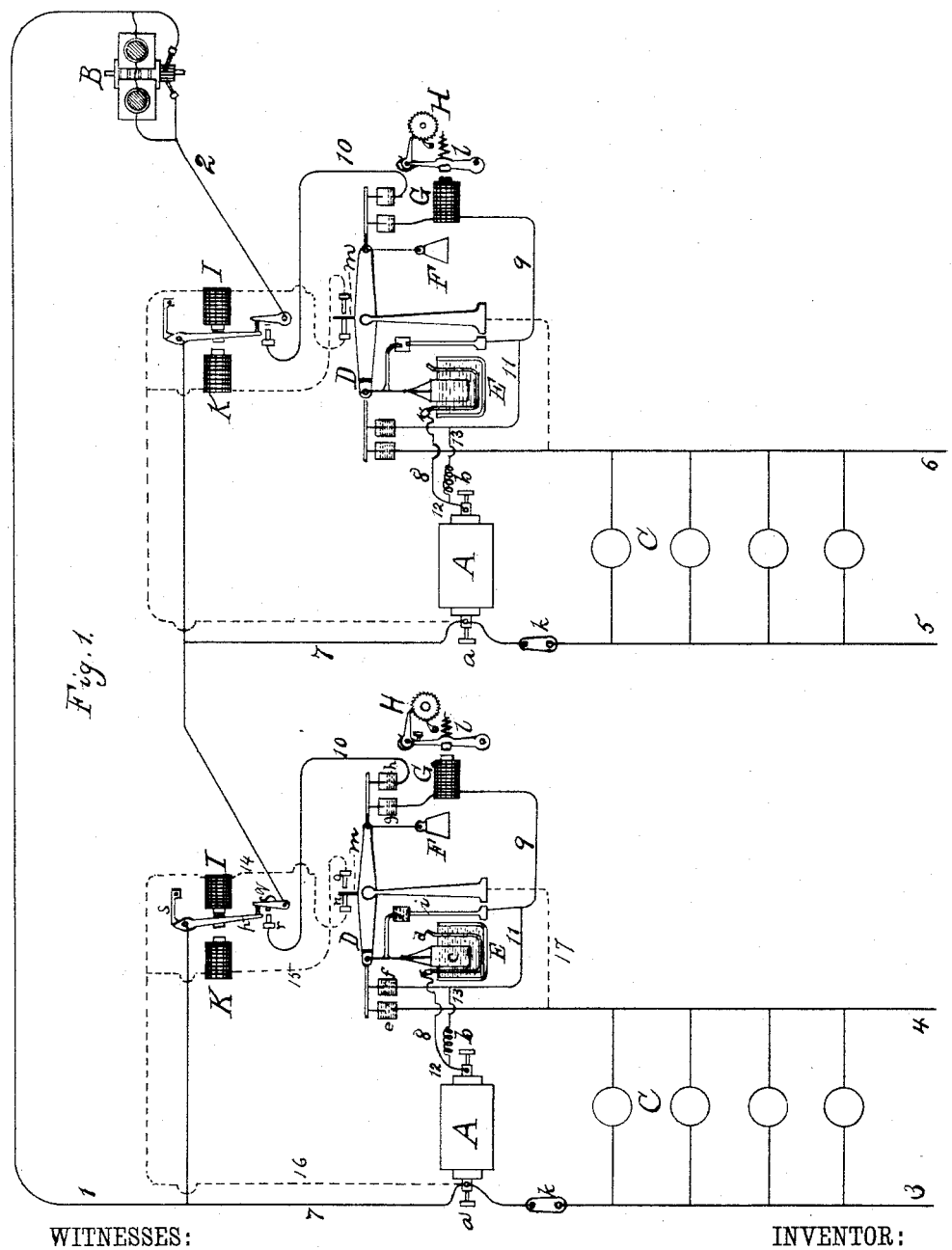

(No Model.)   2 Sheets—Sheet 1.

T. A. EDISON.
SYSTEM OF ELECTRIC LIGHTING.

No. 439,390.   Patented Oct. 28, 1890.

WITNESSES:   INVENTOR:

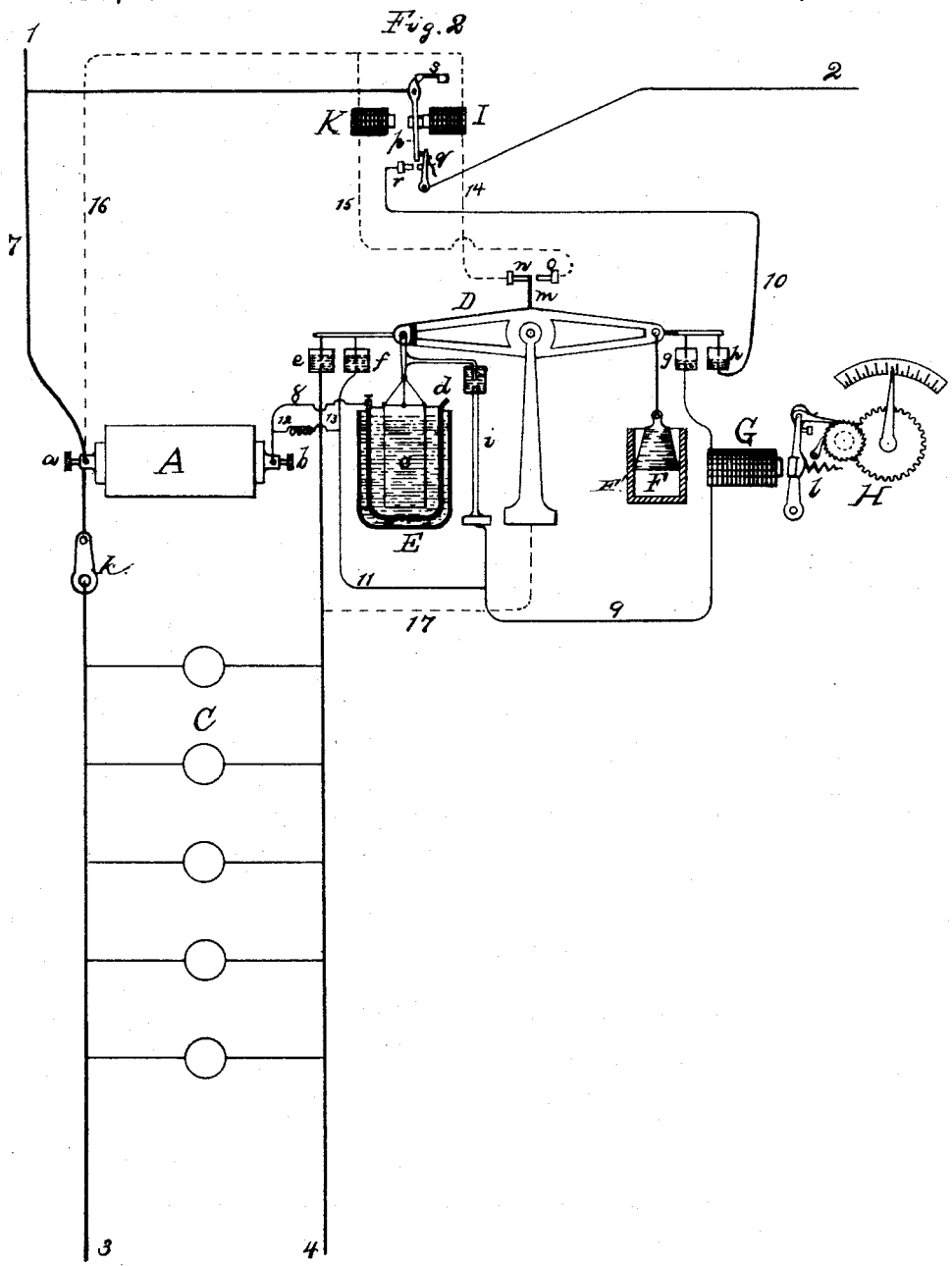

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

SYSTEM OF ELECTRIC LIGHTING.

SPECIFICATION forming part of Letters Patent No. 439,390, dated October 28, 1890.

Application filed June 26, 1882. Serial No. 65,232. (No model.) Patented in England July 14, 1882, No. 3,355; in France November 21, 1882, No. 150,833; in Belgium December 15, 1882, No. 59,751, and in Italy January 13, 1883, No. 14,950.

*To all whom it may concern:*

Be it known that I, THOMAS A. EDISON, of Menlo Park, in the county of Middlesex and State of New Jersey, have invented a new and useful Improvement in Systems of Electric Lighting, (for which I have obtained patents in Great Britain, No. 3,355, bearing date July 14, 1882; in France, No. 150,833, dated November 21, 1882; in Belgium, No. 59,751, dated December 15, 1882, and in Italy, No. 14,950, dated January 13, 1883;) and I do hereby declare that the following is a full and exact description of the same, reference being had to the accompanying drawings, and to the letters and figures of reference marked thereon.

The object I have in view is to produce simple and efficient means for supplying with current the electric lights, motors, or other translating devices of a system more or less extensive, such lights being in separate multiple-arc circuits, and for utilizing a current of high tension in the main conductors, so as to reduce the investment for copper in such main conductors.

Incandescing and arc lamps when arranged in separate multiple arc circuits require a current of comparatively low tension, which, when such lights are run directly from the dynamo or magneto-electric machine or machines in an extensive system including a number of buildings, makes it necessary to use large main conductors in order to avoid a considerable loss of energy in such main conductors. In order to use a current of high tension in the main conductors, I place secondary batteries between the lights and the source of electrical energy, such secondary batteries being first charged from the source of energy and then discharged through the lamps. A secondary battery may be placed in each house or building, and such secondary batteries will be connected in series in one or more main circuits, or may be arranged in multiple arc. To prevent loss of energy, an automatic arrangement is provided for breaking the charging-circuit of each secondary battery and simultaneously completing the circuit to the lamps supplied from such batteries, when the battery is fully charged, without breaking the circuit to the other secondary batteries charged from the same main conductors. The same automatic device will also open the lamp-circuit and complete the charging-circuit through the secondary battery when such secondary battery has been discharged to a definite extent. Means are also provided for measuring the current used by each consumer, and this can be conveniently done by recording the movements of the automatic device just referred to.

An apparatus embodying the invention is illustrated in the accompanying drawings, in which—

Figure 1 is a view, partly diagrammatic, showing two secondary batteries charged in series from the same main circuit and discharging through separate lamp-circuits; and Fig. 2 is a similar view, on a somewhat larger scale, of one secondary battery and connections.

A A represent secondary batteries, which are charged from one or more dynamo or magneto-electric machines B, located in a main circuit 1 2 and supplying the same with a current of high tension. Each secondary battery is a group of secondary cells or batteries, which are preferably connected in series.

The secondary batteries supply lamp-circuits 3 4 and 5 6, in which are located electric lamps (incandescing or arc, or both) C, arranged, preferably, in multiple arc, as shown, although they may be used in series. Each secondary battery has one pole $a$ connected by wire 7 directly with the main circuit 1 2, while the other pole $b$ is connected with such circuit through the automatic circuit-controlling and current-measuring apparatus. This consists of a centrally-pivoted beam D, carrying suspended at its forward end one electrode $c$ of a depositing-cell E, the other electrode of which is shown at $d$. The electrodes of this cell are of amalgamated zinc, immersed in a solution of sulphate of zinc. The beam D at its rear end carries a counterbalancing-weight F, which may be worked in a dash-pot F', Fig. 2, to prevent it from being affected by jars. Contacts $e$ $f$ in mercury cups are made by the depression of the beam at its front end, while mercury-cup contacts $g$ $h$ are made by the depression of the rear end of the beam. The arm carrying the electrode *c* has a permanent mercury-contact with a standard *i*, which mercury-contact permits easy movement, while maintaining the continuity of the circuit at that point. The arm carrying the points dripping in the mercury-cups *g h* is insulated from the body of the beam D, and so are the parts supported by the beam at its other end. The current passes from the main circuit to the pole *a* of each secondary battery through the wire 7, and from the pole *b* of the secondary battery by wire 8 to the depositing-cell E, and through the depositing-cell to the standard *i*, and then by wire 9 to the cup *g*, and from *h* onto the line again by wire 10. In this position the beam D is depressed at its rear end, completing circuit at *g* and *h* and breaking circuit at *e* and *f*. As this secondary battery is charged, there is also a definite deposit made upon the electrode *c*, which deposit is in exact proportion to the charge of the secondary battery. This electrode is thus given greater weight, so that when the secondary battery is fully charged the electrode will overcome the weight F and the beam D will be tipped forward, making contact at *e* and *f* and breaking contact at *g* and *h*. This movement breaks the connection of the secondary battery with the main or charging circuit and completes the connection with its lamp-circuit. The secondary battery now discharges, providing the switch *k* of the lamp-circuit is closed, the current passing from *a* to 3 or 5 through the lamps to 4 or 6, then through *e* and *f* and by wire 11 to *i*, and then through the depositing-cell to the pole *b* of the secondary battery. A recomposition takes place in the depositing-cell at the same time the secondary battery discharges, and the metal is stripped from *c* until the weight F predominates, tipping the beam D to the rear, breaking the lamp-circuit, and completing the charging-circuit through the secondary battery. Advantage is taken of this movement to work a recording apparatus or meter, which may be done by locating an electro-magnet in one part of the circuit, which electro-magnet is energized when that part of the circuit is completed and draws forward an armature-lever, which is retracted by a spring when that part of the circuit is broken. The movement of this armature-lever works a meter having, preferably, two or more dials recording in equivalents of a thousand cubic feet of gas and fractions thereof.

The electro-magnet G is placed in wire 9, the mechanism shown at H representing the recording apparatus or meter worked by the armature-lever *l*. A shunt 12 13 may be formed around the depositing-cell, and may have a definite resistance, so that only a certain definite part of the current passing to and from the secondary battery will pass through the depositing-cell.

The secondary batteries are preferably charged in series, and a current of high tension is used in the main circuit. This arrangement of the secondary batteries in series referred to in the description and claims is intended to apply to the connection of the complete batteries in the charging-circuit. Within itself each secondary battery may have the pairs of electrodes, cells, or smaller secondary batteries of which it is composed arranged in any suitable way in series, multiple series, or multiple arc. To prevent the automatic circuit-controlling device of one secondary battery from breaking permanently the main circuit and cutting off the current to other secondary batteries in the process of being charged, a device is provided for closing a shunt around the secondary battery and the mechanism connected therewith when the circuit-controller opens the charging-circuit at the secondary battery, and for opening this shunt when the charging-circuit is completed at the secondary battery. For this purpose the beam D is provided with a yielding contact-spring *m*, which engages with front and back contacts *n o*. From these contacts circuit-wires 14 15 run to two electro-magnets I K, from which there is a common circuit-connection 16 with the pole *a* of the secondary battery. Conductor 4 or 6 is connected by wire 17 with the standard which supports the beam D.

An armature-lever *p* stands between the electro-magnets I and K and when attracted by I strikes a lever *q* and pushes it from a contact *r*. A spring *s* or equivalent device is employed to hold the armature-lever *p* at the limits of its movement. The main circuit is connected with the armature-lever *p* and the lever *q*, while the circuit of the secondary battery is connected by wire 10 with the contact *r*, and by wire 7 with the main circuit on the other side of the armature-lever *p*. Now it will be seen that when the beam D tips forward, breaking the charging-circuit at *g h* and closing the lamp-circuit at *e f*, the spring *m* will make contact *n*, closing the circuit through electro-magnet I, which will thus be energized by current from the secondary battery. This magnet will attract *p*, forcing *q* from *r*, breaking the connection of the secondary battery with the main circuit, and completing the main circuit by the contact of *p* and *q*. When the beam D tips to the rear, completing circuit at *g* and *h* and breaking circuit at *e f*, the spring *m* will make contact with *o*, completing circuit through K. The lever *p* will be attracted by K breaking contact with *q*, while *q* will complete the charging-circuit through the secondary battery at *r*.

It is desirable in breaking the main or charging circuit through each secondary battery at the mercury-cup *g h* that contact should be made at *e f* and *m n* before the circuit is broken at *g h*, and also in completing the charging-circuit through each secondary battery that contact should be made at *g h* and *m o* before circuit is broken at *e f*.

In this way the main or charging circuit will be kept closed constantly.

What I claim is—

1. In a system of electric lighting, the combination, with a generator of electricity and electric lamps in two or more groups, of two or more secondary batteries in series with said generator and with each other and switches connected with the charging or generator circuit and to the consumption-circuit for disconnecting the batteries from the charging-circuit and connecting them separately to a group of lamps, substantially as set forth.

2. In a system of electric lighting, the combination, with a generator of electricity and electric lamps in the consumption-circuit, of a secondary battery in the generator-circuit and a switch connected to the generator-circuit and to the consumption-circuit, in one position holding the charging-circuit closed and the consumption-circuit open, and in a second position reversing the connections, and operated by the charge and discharge of the battery, substantially as described.

3. In a system of electric lighting, the combination, with a generator of electricity and electric lamps, of two or more secondary batteries in the generator or charging-circuit, a switch for each battery operated by the charge and discharge of the battery, and switch-contacts in the charging and consumption circuits and connected and disconnected by said switch, whereby the battery when charged is disconnected from the generator and connected to the lamp, and when discharged to a certain extent is disconnected from the lamps and connected to the generator, substantially as set forth.

4. In a system of electric lighting, the combination, with a generator of electricity, of a number of secondary batteries located in series in the generator-circuit and connected with separate lamp-circuits, and circuit-controllers for automatically throwing each secondary battery into connection with the generator and lamps alternately, and for completing the charging-circuit around the battery when said battery is thrown into connection with the lamps, substantially as set forth.

5. In a system of electric lighting, the combination, with a generator of electricity and electric lamps, of an intermediate secondary battery, an electro-depositing cell affected by the current in the same proportion as the secondary battery, and the circuit-controller for throwing the secondary battery alternately into connection with the generator and with the lamps, substantially as set forth.

6. In a system of electric lighting, the combination, with a generator of electricity and electric lamps, of an intermediate secondary battery, an electro-depositing cell in the circuit of the secondary battery, a beam carrying suspended one electrode of such depositing-cell and a counter-weight, mercury-contacts, and suitable connections for throwing the secondary battery alternately into connection with the generator and the lamps, substantially as set forth.

7. In a system of electric lighting, the combination, with a main or charging circuit, of a secondary battery charged from such main circuit, an electro-depositing cell having one electrode suspended on a pivoted beam, which carries a counter-weight, contacts made by such beam for throwing the secondary battery alternately into connection with the main circuit and an electric-lamp circuit, a shunt in main circuit around such secondary battery, electro-magnets opening and closing this shunt, and contacts made by the beam for completing circuit through said electro-magnets alternately, substantially as set forth.

8. In a system of electric lighting, the combination, with a generator and lamps, of an intermediate secondary battery, an automatic circuit-controller for throwing the secondary battery alternately into connection with the generator and lamps, an electro-magnet located in one portion of the circuit and actuated by the movement of such circuit-controller, and recording apparatus operated by said electro-magnet, substantially as set forth.

9. The improved system of distributing electricity for light, heat, and power, involving the combination of the following elements, viz: a main or charging circuit leading from the source of electrical energy to the buildings in which the translating devices are located, secondary batteries located in the separate buildings, arranged in series, consumption-circuits in the separate buildings, including the translating devices, and means in connection with the secondary battery (or batteries) of each building for connecting the battery first with the main or charging circuit and then with its individual consumption-circuit, substantially as set forth.

10. The improved system of distributing electricity for light, heat, and power, involving the combination of the following elements, viz: a main or charging circuit leading from the source of electrical energy to the buildings in which the translating devices are located, secondary batteries located in the separate buildings and arranged to be connected in series with the main or charging circuit, consumption-circuits in the separate buildings, translating devices arranged in multiple arc in each consumption-circuit, and means in connection with the secondary battery (or batteries) of each building for connecting the battery first with the main or charging circuit and then with its individual consumption-circuit, the current in the consumption-circuit having a lower tension than that in the main or charging circuit, substantially as set forth.

This specification signed and witnessed this 19th day of June, 1882.

THOMAS A. EDISON.

Witnesses:
RICHD. N. DYER,
EDWARD H. PYATT.